United States Patent [19]
Childress et al.

[11] Patent Number: 5,623,755
[45] Date of Patent: Apr. 29, 1997

[54] ENGINE OIL FILTER ADAPTER ASSEMBLY FOR FACILITATING THE REMOVAL OF AN OIL FILTER WITHOUT SPILLING OIL

[76] Inventors: Walter F. Childress, 15123 Elmbrook Dr., La Mirada, Calif. 90638; Steven W. Childress, Rte. 1, Box 400, Coldwater, Miss. 38618

[21] Appl. No.: 583,659

[22] Filed: Jan. 5, 1996

[51] Int. Cl.$^6$ .................................................. B01D 35/00
[52] U.S. Cl. ......................... 29/426.5; 210/248; 141/88; 141/114; 141/384
[58] Field of Search .................... 210/248; 123/198 DA; 184/1.5, 106; 141/10, 86, 88, 97, 98, 106, 114, 313, 383, 384, 391; 29/426.1, 426.5

[56] References Cited

U.S. PATENT DOCUMENTS 4,020,922  5/1977  Klasel ........................ 184/1.5
4,877,155  10/1989  Tall ............................ 184/1.5

*Primary Examiner*—Matthew O. Savage
*Attorney, Agent, or Firm*—Edgar W. Averill, Jr.

[57] ABSTRACT

An adapter assembly to assist in the removal of an oil filter without spilling oil. The assembly includes a drain cup adapter for permanent affixing to the oil filter stud which extends from an engine block. The drain cup adapter has an inner face with openings for passage of oil and a central threaded opening permitting it to be permanently screwed onto the oil filter stud. An external ring is used for removably attaching a bag holding member. The bag holding member has a flexible bag through which the oil filter can be contacted and which holds the oil and the filter after the filter has been removed. After all the oil has drained out of the engine block, the bag holding member is removed and a new filter screwed onto the oil filter stud.

8 Claims, 5 Drawing Sheets

ENGINE OIL FILTER ADAPTER ASSEMBLY FOR FACILITATING THE REMOVAL OF AN OIL FILTER WITHOUT SPILLING OIL

BACKGROUND OF THE INVENTION

The field of the invention is motor vehicle engine accessories and the invention relates more particularly to the servicing of such vehicles and still more particularly to the removing of an oil filter without spilling oil.

Anyone who has changed the engine oil and oil filter in a motor vehicle will understand the challenge of removing an oil filter without spilling oil on a driveway or without having the oil run down one's arm. It is important to periodically change an oil filter so that it does not become clogged and thus, this messy job is a recurring one.

Several approaches have been taken to help solve this problem. One such approach is shown in U.S. Pat. No. 4,376,703 where a cover is placed over the oil filter just before it is to be removed. The cover has a flexible top with folds which help hold it against the engine block as the oil filter is unscrewed. Once the oil filter is unscrewed, the cover is held under the opening in the engine block to capture oil as it drains out of the engine. Unfortunately, the time required for the oil to drain is substantial and thus, the use of this device is somewhat tedious. Another device with this same shortcoming is shown in U.S. Pat. No. 4,020,922 where a wide mouth funnel holding a flexible bag is placed over the filter. The filter is then unscrewed and captured in the bag and the funnel is held under the opening in the engine block until the oil has drained out of the engine. This device as well as the aforementioned device of U.S. Pat. No. 4,376,703 would not be useful in an oil filter that is mounted very far from a vertical position since the oil would leak out at the top of the funnel or at the top of the flexible cup.

Several gasoline filters have been provided with spill-protecting devices to help capture gasoline spilling out when the gasoline filter is removed. One such device is shown in U.S. Pat. No. 4,877,155 where a flexible bag is placed over the filter and has an associated funnel and flexible tube leading out of the bag. As the filter is removed, the gasoline flows into the bag and out the flexible tube. A somewhat different design for this same problem is shown in U.S. Pat. No. 4,929,356 where a protective cover with a lower annular seal is placed over the filter and the cover has a drain tube at the bottom thereof. A permanently affixed adapter is shown in U.S. Pat. No. 5,327,862. The device expedites the removal of oil from an internal combustion engine above the filter.

None of the above devices make the removal of an oil filter without spilling an easy task, although they are improvements over the most common system, namely that of unscrewing the filter and hoping that the oil will fall into the collection pan.

BRIEF SUMMARY OF THE INVENTION

It is an object of the present invention to provide an assembly to help in removing an oil filter without spilling oil.

The present invention is for an adapter assembly for facilitating the removal of an oil filter without spilling oil. The assembly includes a drain cup adapter which is permanently affixed between the oil filter and an engine block by screwing the adapter onto the oil filter stud extending from the engine block. The drain cup adapter has an external ring that has an inner surface that is slightly larger than the outer surface of an oil filter with which it is to be used. The drain cup adapter is sealed to the engine at one end and is open at the bottom. It has an external wall to which a bag holding member may be movably affixed. A bag holding member has an upper ring which fits over the drain cup adapter. The bag holding member holds a flexible self-locking type of bag that is large enough to hold a removed oil filter together with all the oil that flows out as the oil filter is removed. After the oil filter is removed and all the oil has drained out of the engine block, the bag holding member and associated bag are removed and disposed of in an appropriate manner. A new oil filter is screwed onto the oil filter stud within the drain cup adapter and is sealed against the drain cup adapter.

The present invention also includes the method of using the adapter assembly which includes the step of loosening the oil filter from the engine block by beginning to unscrew it. Next, a bag holding member with an associated flexible bag is attached to a permanently affixed drain cup adapter. Then the flexible bag is grasped to the oil filter and completely unscrewed. Next, the oil filter is allowed to fall into the bag and sufficient time is allowed to let all the oil drip out of the engine block into the bag after which the bag holding member and associated bag are removed, sealed within the self-locking bag, and appropriately disposed of.

DESCRIPTION OF THE PREFERRED EMBODIMENTS

Figure 1:
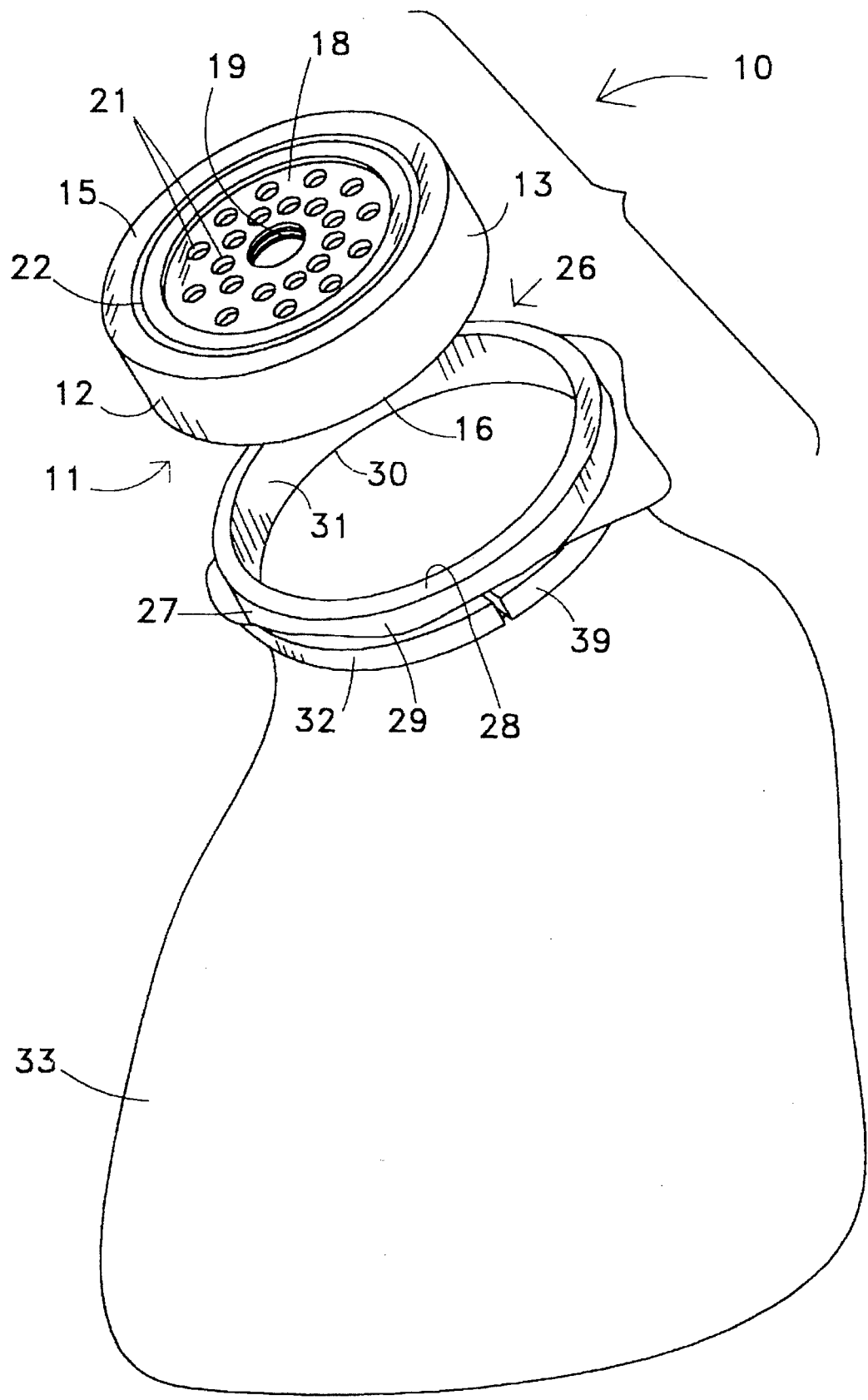
FIG. 1 is an exploded perspective view of the adapter cup bag holding member and flexible bag of the present invention.

An assembly to assist in the removal of an engine oil filter without spilling oil is shown in perspective view in FIG. 1 and indicated generally by reference character 10. Assembly 10 includes a drain cup adapter 11 which has an external ring 12 with an outer surface 13. External ring 12 has an inner surface 14 shown in FIG. 2 which is slightly larger than the outer diameter "D" of the oil filter 17 also shown in FIG. 2. External ring 12 has an engine end 15 and a remote end 16. An end wall 18 extends inwardly from the engine end 15 of external ring 12 and has a threaded central opening 19 parallel to the central axis 20 of the external ring 12. The end wall 18 has oil passageways 21 therethrough and a groove 22 which preferably contains an O-ring 34. An engine block 24 has an engine oil filter stud 35 which is threaded into threaded central opening 19 and extends therethrough so that it may be screwed into the threaded internal opening 36 of oil filter 17. The external bag holding member 26 should be able to be supported by the external ring 12. Although a groove and detent pins can be used, a friction fit provides a satisfactory attachment means. The adapter ring 11 is permanently affixed to engine oil filter stud and is sealed against the outer surface 23 of engine block 24 in a manner analogous to that used by a conventional oil filter 17.

Figure 4:
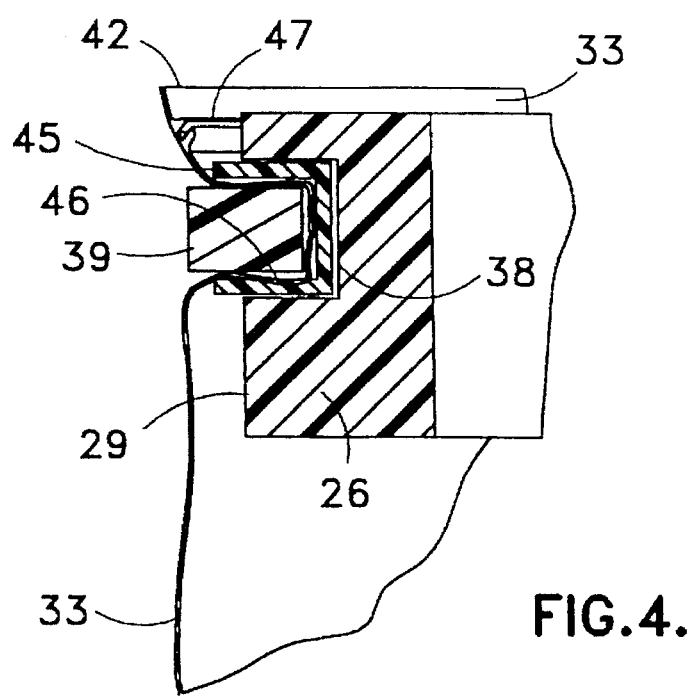
FIG. 4 is an enlarged cross-sectional view of the slip ring of the flexible bag holding member of FIG. 1.

Bag holding member 26 also has an external ring 27 which has an inner end 28, an outer surface 29, an outer end 30 and an inner surface 31 which fits over the outer surface 13 of drain cup adapter 11. Means are provided for removably holding a flexible bag 33 to the bag holding member 26 as shown best in FIG. 4. An annular groove 38 is formed around the outer surface 29 of bag holding member 26 and a slip ring 45 is rotatingly held in groove 38. A split ring 39 is held in an outer recess 46 in slip ring 45. Split ring 39 holds flexible bag 33 to slip ring 45 and slip ring 45 easily turns allowing the bag 33 to turn with respect to bag holding member 26.

In use, the drain cup adapter 11 has been permanently affixed between the engine and the oil filter 17. Oil filter 17 has a conventional sealing ring 40 which instead of being sealed against the outer surface 23 of engine block 24 is sealed against the under surface 41 of drain cup adapter 11.

Figure 2:
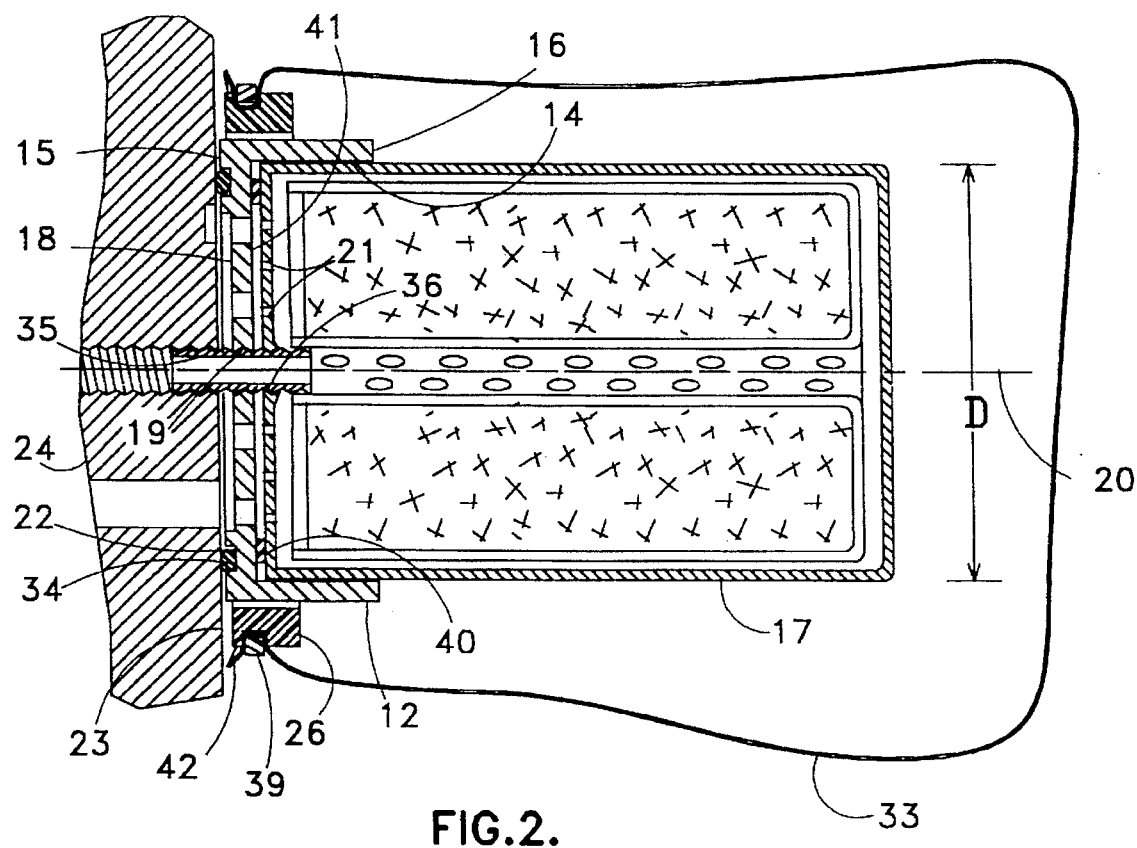
FIG. 2 is a cross-sectional view of the drain cup adapter flexible bag holding member, the flexible bag and an oil filter attached to an engine oil filter stud of an engine block.
Figure 3:
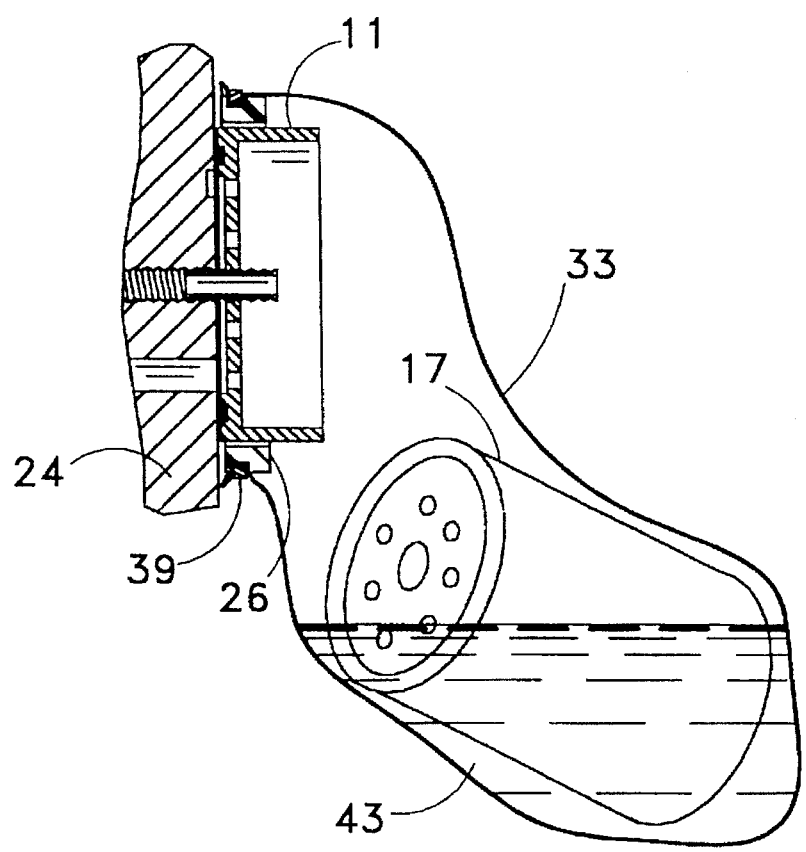
FIG. 3 is a view analogous to FIG. 2 except with the oil filter removed and held within the flexible bag.

The method of using the assembly of the present invention, after the drain cup 11 has been permanently affixed to the engine oil filter stud 35 and the oil filter 17 is ready for removal, includes the following steps. First the oil filter 17 is loosened by attaching a conventional oil filter wrench thereto and beginning to unscrew it from the under surface 41 of adapter 11 stopping when filter is only finger-tight. Then the bag holding member 26 is fitted with a flexible self-locking bag 33 by removing split ring 39, placing the open end 42 of bag 33 over the outer recess 46 of slip ring 45 held by external bag holding ring 27. Then the split ring 39 is replaced and the bag is removably held onto the bag holding member 26 by being compressed within the recess of inner slip ring by the compression of outer split ring 39. Next, the bag holding member is attached to the drain cup adapter and the flexible bag completely surrounds the oil filter as shown in FIG. 2 of the drawings. Then the oil filter 17 is grasped through the flexible bag 33 and unscrewed and allowed to fall into the bottom of the flexible bag 33 as shown in FIG. 3. The oil filter 17 and a certain amount of drain oil 43 is held in flexible bag 33 long enough for the oil to drip out of the engine block 24. Then the bag holding member 26 and associated bag 33 is removed from the drain cup adapter 11 and a new oil filter is screwed onto engine oil filter stud 35 and sealed against the under surface 41 of drain cup adapter 11. Preferably flexible oil holding bag 33 has a self-locking groove or locking strip 47 at the upper end to facilitate holding the drained oil and filter for proper disposal.

Figure 5:
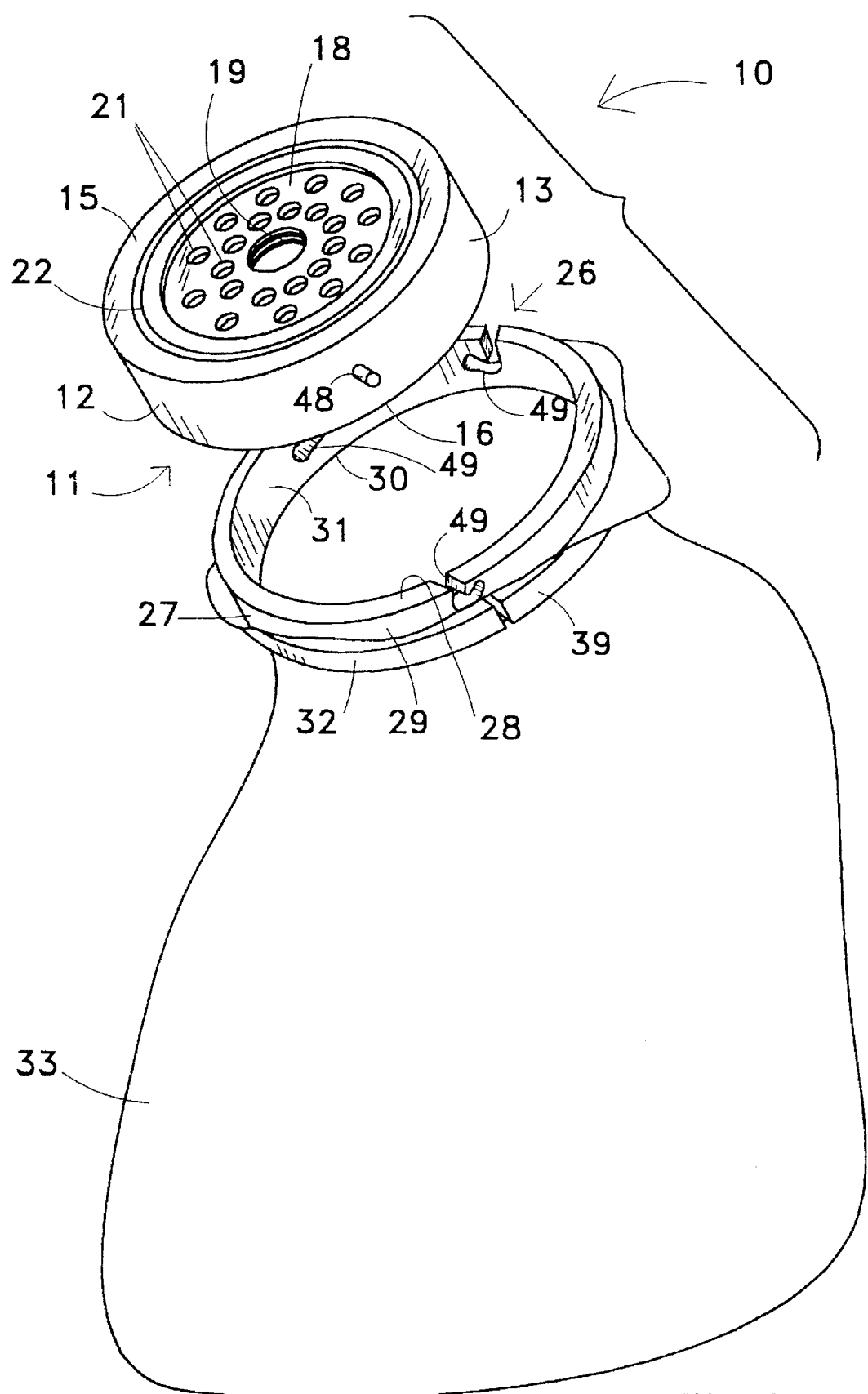
FIG. 5 is an exploded perspective view of an alternate embodiment of the adapter cup bag holding member and flexible bag of the present invention.

FIG. 5 shows an exploded view analogous to FIG. 1 but including an additional feature, namely a non-friction holding means for holding bag holding member 26 to the drain cup adapter 11. This holding means consists of three pins 48 extending outwardly from drain cup adapter 11 and three locking slots 49 which mate with the pins 48 and securely hold bag holding member 26 to drain cup adapter 11. Locking slots 39 are shaped so that they lock when the bag holding member is turned in a counter clockwise direction. In this way it will not tend to unlock as the oil filter is unscrewed.

Figure 6:
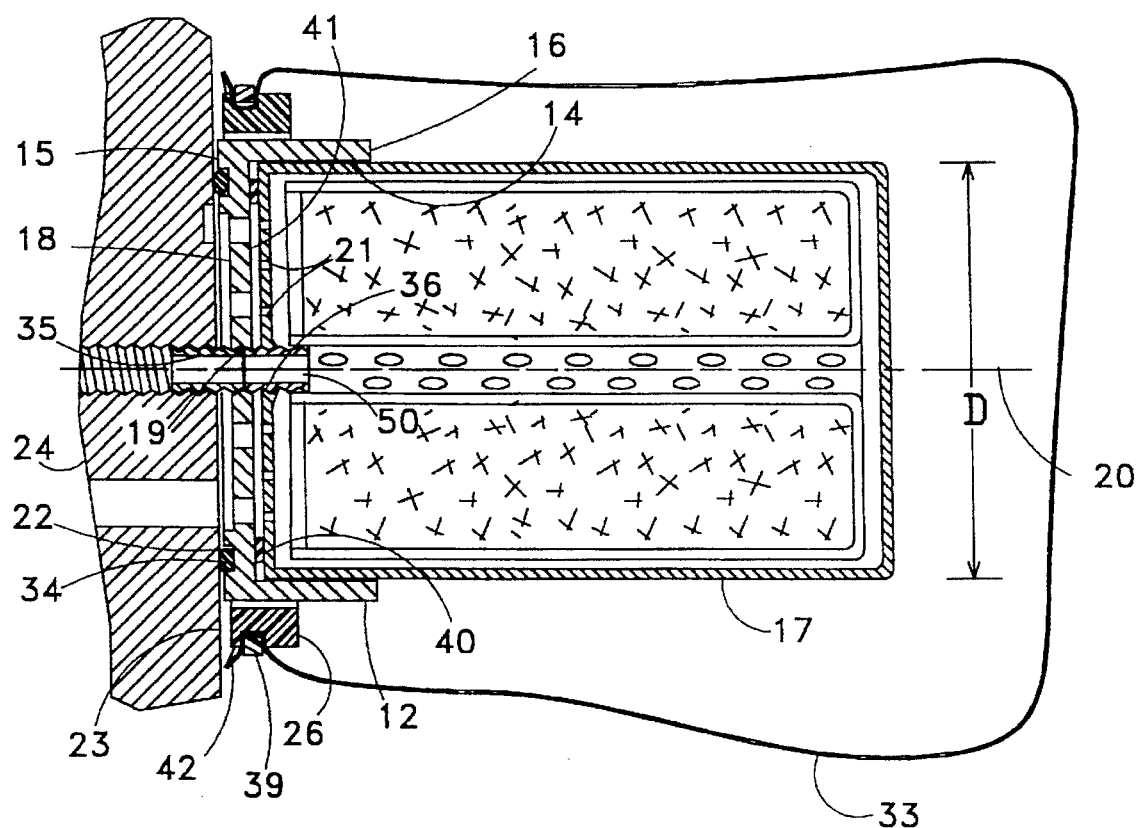
FIG. 6 is a cross-sectional view of an alternate embodiment of the drain cup adapter flexible bag holding member, the flexible bag and an oil filter attached to an engine oil filter stud of an engine block.

In some engines the oil filter stud 35 extends only a short distance away from the block 24. For such occasions, a second short stud 50 may be used as shown in FIG. 6 and also held by the threaded opening 19 of drain cup adapter 11.

While a bag 33 is shown as being attached to bag holding member 26, it is, of course, contemplated that a bag and bag holding member could be provided which are both disposable and this attaching method would not be needed. An important feature of the assembly of the present invention is its ability to assist in the removal of filters which are not vertically oriented. Thus, if the filter is generally horizontal, the assembly of the present invention will still be useful unlike most of the prior art devices. It is, thus, adaptable to almost any engine and requires very little space around the outer edge of an oil filter. It may be inexpensively fabricated and easily used by a motor vehicle owner to greatly facilitate the oil changing process.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. An adapter assembly for facilitating the removal of an oil filter without spilling oil comprising:

a drain cup adapter for permanent affixing to an oil filter stud extending from an engine block, said drain cup adapter having an external ring having an outer surface and an inner surface, an engine end and a remote end, said inner surface being slightly larger than an outer diameter of an oil filter with which it is to be used, said drain cup adapter having an end wall at the engine end thereof, said end wall having a threaded central opening parallel to a central axis of said external ring, said end wall further having oil passageways therethrough and a sealing ring for contact and sealing with an engine block to which it is to be affixed; and a bag holding member having an external bag holding ring, having an inner end, an outer surface, an outer end and an inner surface, the inner surface being large enough so that it fits over the outer surface of the drain cup adapter, said bag holding member having means for removable attachment to said drain cup adapter and also having means for attachment of a flexible oil holding bag.

2. The adapter for facilitating the removal of an oil filter of claim 1 wherein said means for attachment of a flexible oil holding bag comprises an external groove located on the outer surface of the external bag holding ring and a snap ring removably held in said external groove.

3. The adapter for facilitating the removal of an oil filter of claim 2 wherein said means for attachment of a flexible oil holding bag comprises a slip ring having an outer recess, said slip ring being rotatingly held in said external groove located on the outer surface of the external bag holding ring and said snap ring removably held in said outer recess of said slip ring.

4. The adapter for facilitating the removal of an oil filter of claim 1 wherein said means for affixing a bag holding member comprises a friction fit between the outer surface of the external ring and the inner surface of said bag holding member.

5. The adapter for facilitating the removal of an oil filter of claim 1 wherein said drain cup adapter is fabricated from aluminum.

6. A method of removing an oil filter from an engine block having an engine oil filter stud for holding an oil filter and to which a drain cup adapter has been affixed, said drain cup adapter being positioned between an oil filter and the engine block and including an external ring with attachment means thereon, said method comprising the steps of:

loosening the oil filter from the engine block by beginning to unscrew the oil filter from the oil filter stud;

affixing a bag holding member with an associated flexible bag having a closed bottom to said attachment means of said external ring of said drain cup adapter;

grasping the oil filter through said flexible bag;

completely unscrewing the oil filter from the engine oil filter stud and allowing the oil filter to fall into the flexible bag;

waiting a time sufficient for all the oil to drain out of the engine block into the flexible bag; and removing the bag holding member and associated flexible bag from the drain cup adapter.

7. The method of claim 6 further including the steps of:

securing a flexible bag to said bag holding member by placing an open end of the flexible bag over a slip ring held in an annular groove in an outer surface of said bag holding member and expanding a split ring and placing it over the outer surface of said flexible bag near an open end thereof and allowing the split ring to snap into a recess in said slip ring whereby said flexible bag turns with the oil filter as it is unscrewed, said securing step being performed before said affixing step; and detaching said flexible bag from said bag holding member after said removing step.

8. The method of claim 7 wherein said flexible bag has a locking strip at the open end thereof and including the further step of sealing said locking strip after said detaching step.

* * * * *